(12) United States Patent
Kitai

(10) Patent No.: US 8,198,768 B2
(45) Date of Patent: Jun. 12, 2012

(54) MOTOR

(75) Inventor: Toshiyuki Kitai, Hamamatsu (JP)

(73) Assignee: ASMO Co., Ldt., Shizuoka-ken (JP)

( * ) Notice: Subject to any disclaimer, the term of this patent is extended or adjusted under 35 U.S.C. 154(b) by 255 days.

(21) Appl. No.: 12/774,437

(22) Filed: May 5, 2010

(65) Prior Publication Data

US 2010/0283339 A1 Nov. 11, 2010

(30) Foreign Application Priority Data

May 8, 2009 (JP) .................................. 2009-113919

(51) Int. Cl.
H02K 11/00 (2006.01)

(52) U.S. Cl. ............................ 310/71; 310/68 B; 310/51

(58) Field of Classification Search .................... 310/51, 310/68 B, 71, 68 R, 89
See application file for complete search history.

(56) References Cited

U.S. PATENT DOCUMENTS

| | | | | |
|---|---|---|---|---|
| 6,653,754 B2 * | 11/2003 | Uchida et al. | ................... | 310/51 |
| 7,187,095 B2 * | 3/2007 | Kokubu et al. | .............. | 310/75 R |
| 7,298,062 B2 * | 11/2007 | Kokubu et al. | .............. | 310/75 R |
| 7,834,498 B2 * | 11/2010 | Shiino et al. | ................... | 310/71 |
| 2005/0184606 A1 * | 8/2005 | Kokubu et al. | .............. | 310/75 R |
| 2007/0120431 A1 * | 5/2007 | Kokubu et al. | .............. | 310/75 R |
| 2009/0021091 A1 * | 1/2009 | Shiino et al. | ..................... | 310/71 |
| 2009/0295325 A1 * | 12/2009 | Sekine et al. | ................. | 318/646 |
| 2010/0264670 A1 * | 10/2010 | Usami et al. | ................. | 290/38 R |

FOREIGN PATENT DOCUMENTS

| | | |
|---|---|---|
| JP | 5-29281 | 4/1993 |
| JP | 6-60281 | 8/1994 |
| JP | 07-194063 | 7/1995 |
| JP | 2000-023434 | 1/2000 |

* cited by examiner

*Primary Examiner* — Thanh Lam
(74) *Attorney, Agent, or Firm* — Patterson Thuente Christensen Pedersen, P.A.

(57) ABSTRACT

A motor including electrical components laid out to avoid enlargement of the motor. The motor includes a rotor, a cylindrical housing including a closed end and an open end and accommodating the rotor, and an end bracket fixed to the housing to close the open end and including a connector support. Two power supply terminals extend to the connector support. A noise prevention element includes a connection terminal connected to the power supply terminals. A rotation detector detects rotation of the rotor and includes a detector body. The noise prevention element is arranged between the two power supply terminals. The detector body and the noise prevention element are arranged at a portion of the end bracket closer to the connector support and aligned in an axial direction of the motor.

5 Claims, 4 Drawing Sheets

MOTOR

BACKGROUND OF THE INVENTION

The present invention relates to a motor including electrical components such as a noise prevention element and a rotation detector.

Japanese Laid-Open Patent Publication No. 7-194063 describes an example of a motor including a yoke (housing) and an end bracket. The yoke accommodates an armature (rotor) in a rotatable manner. The end bracket closes an open end of the yoke. A noise prevention element such as a capacitor is arranged in the end bracket.

Recent motors have an increased number of electrical components. For example, in addition to the above-mentioned noise prevention element, an electronic component such as a rotation detector, which detects rotation or rotational speed as rotation information, may be arranged in a motor. An increase in the number of electrical components enlarges the motor. Accordingly, it is required that the layout of the electrical components be optimized to avoid enlargement of the motor, especially in the radial direction.

SUMMARY OF THE INVENTION

It is an object of the present invention to provide a motor including electrical components that are laid out in an optimal manner so as to avoid enlargement of the motor.

To achieve above object, one aspect of the present invention provides a rotor, a cylindrical housing, an end bracket, two power supply terminals, a noise prevention element, and a rotation detector. The cylindrical housing includes a closed end and an open end and accommodates the rotor in a rotatable manner. The end bracket is fixed to the housing so as to close the open end and includes a connector support. The two power supply terminals extend to the connector support for electrical connection between the rotor and an external device. The noise prevention element includes a connection terminal connected to the two power supply terminals. The rotation detector detects rotation information of the rotor and includes a detector body having a detection element. The noise prevention element is arranged between the two power supply terminals. The detector body and the noise prevention element are arranged at a portion of the end bracket closer to the connector support and aligned in an axial direction of the motor.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of the present invention will now be discussed with reference to the drawings.

Figure 1:
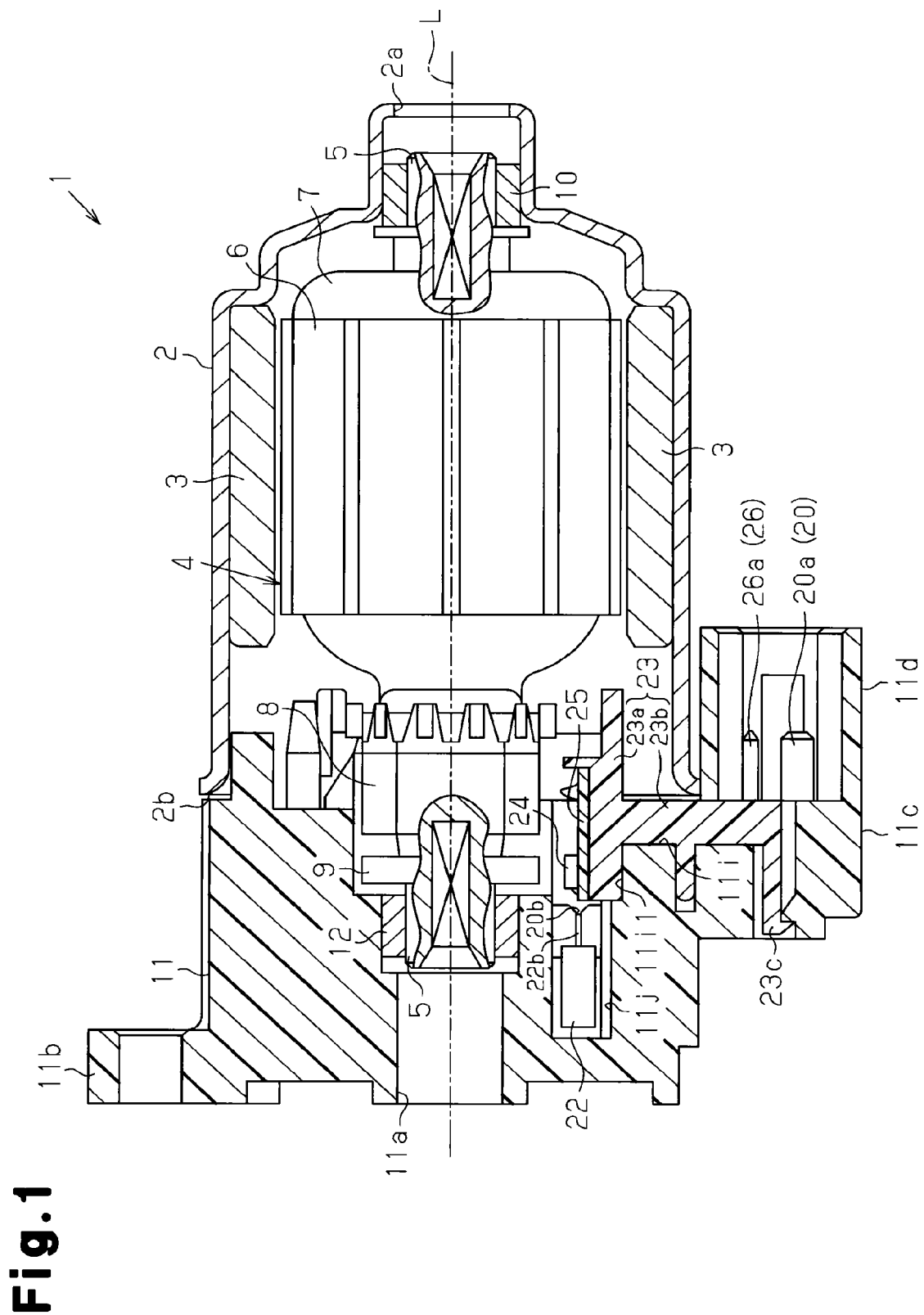
FIG. 1 is a cross-sectional view showing a motor according to one embodiment of the present invention taken along the axial direction of the motor.

FIG. 1 shows a motor 1 of the present embodiment. The motor 1 is a DC motor including a brush and used as a drive source for a power seat apparatus of a vehicle. More specifically, the motor 1 is used for mechanisms arranged in a seat, such as a mechanism for sliding a seat in forward and reverse directions or a mechanism for inclining a backrest of a seat.

The motor 1 includes a cylindrical yoke 2, which is formed from a magnetic metal material and has a closed end. Field magnets 3 are fixed to the inner surface of the yoke 2. An armature 4 is arranged at the inner side of the field magnets 3 and supported to be rotatable relative to the yoke 2. The armature 4 includes a rotary shaft 5, a core 6, a coil 7, a commutator 8, and a sensor magnet 9. The core 6 is fixed to the rotary shaft 5. The coil 7 is wound around the core 6. The commutator 8, which is connected to the coil 7, is fixed to the rotary shaft 5 at a portion located further toward the distal side (toward an open end 2b of the yoke 2) from the core 6. The sensor magnet 9 is fixed to the rotary shaft 5 at a portion located further toward the distal side from the commutator 8. The rotary shaft 5 has a basal portion supported to be rotatable by a bearing 10, which is held in the central part of the closed end of the yoke 2. The basal portion of the rotary shaft 5 is connectable to a load device such as a mechanism of the seat by a coupler inserted into a hole 2a extending through the central part of the closed end of the yoke 2. An end bracket 11 is fixed to the open end 2b of the yoke 2 so as to close the open end 2b with the armature 4 accommodated in the yoke 2.

As shown in FIGS. 1 to 4, the end bracket 11, which is formed from a resin material, has a predetermined shape to close the open end 2b. A hole 11a extends through the central part of the end bracket 11 along the axis L of the motor 1 (rotary shaft 5). The distal portion of the rotary shaft 5 is inserted into the hole 11a and supported to be rotatable by a bearing 12, which is held in the hole 11a. The distal portion of the rotary shaft 5 is connectable to the load device by a coupler inserted into the hole 11a.

Figure 2:
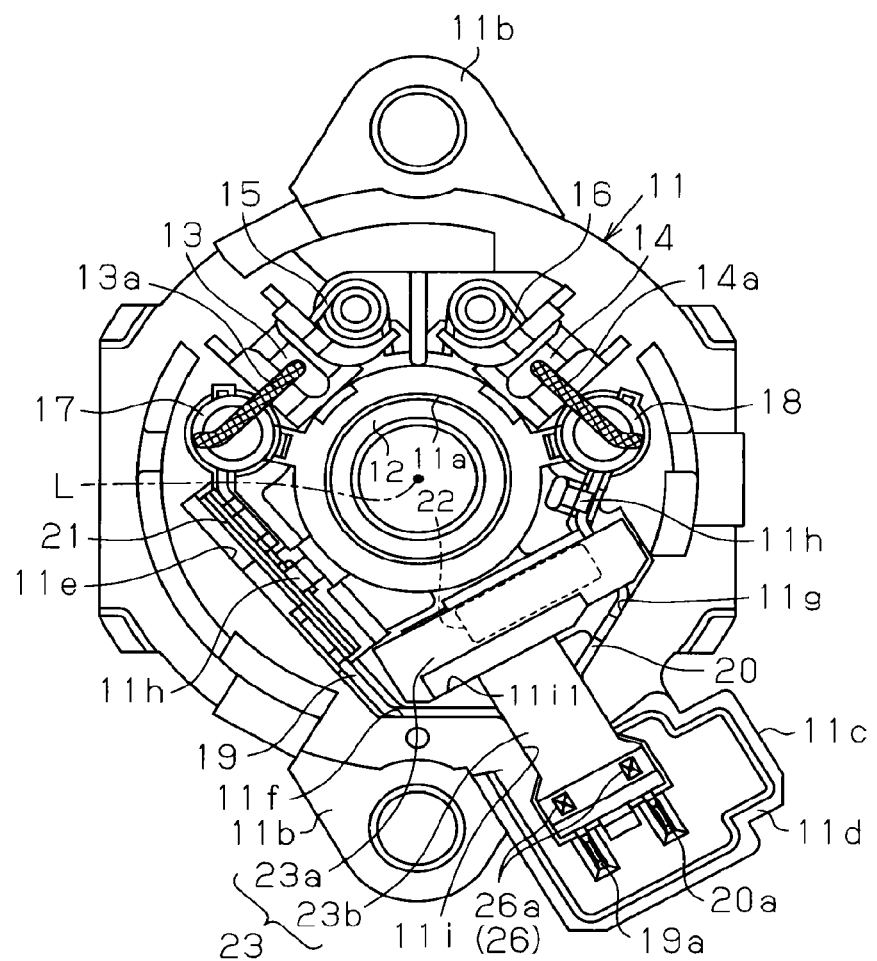
FIG. 2 is a plan view showing an end bracket with a rotation detector attached thereto.
Figure 3:
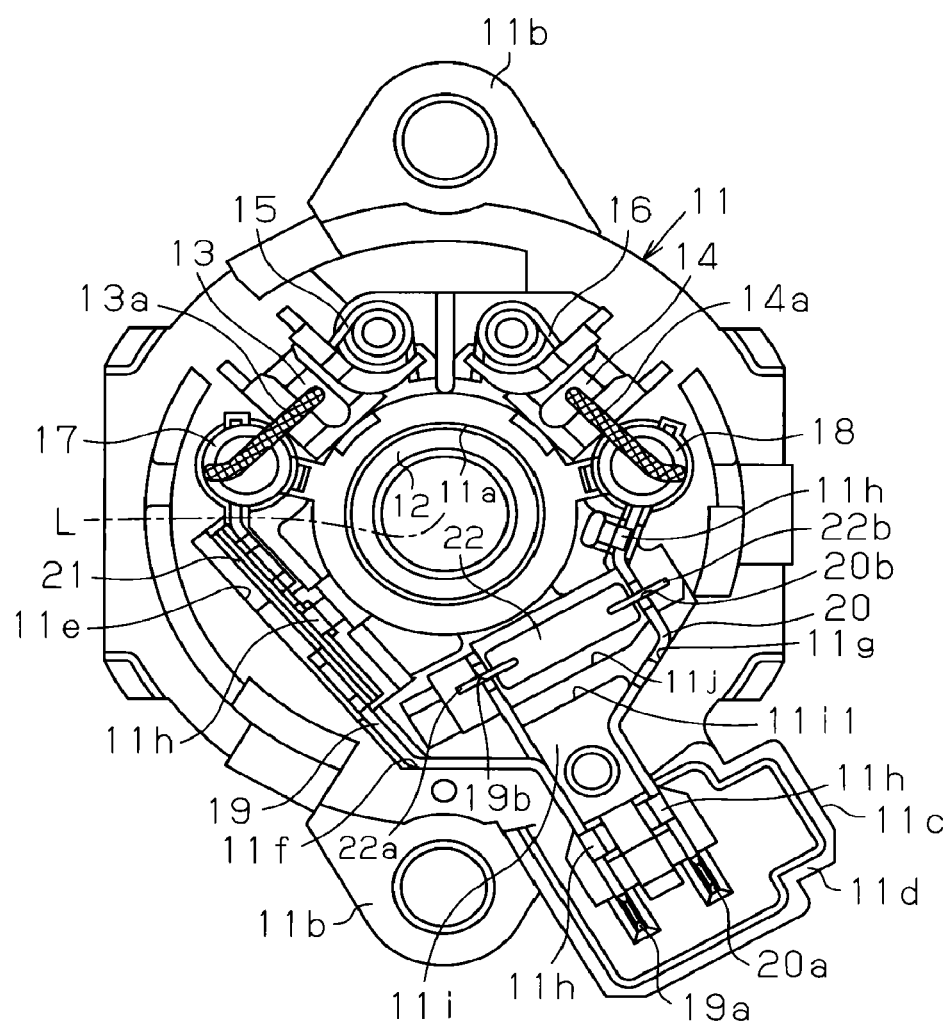
FIG. 3 is a plan view showing the end bracket without the rotation detector.
Figure 4:
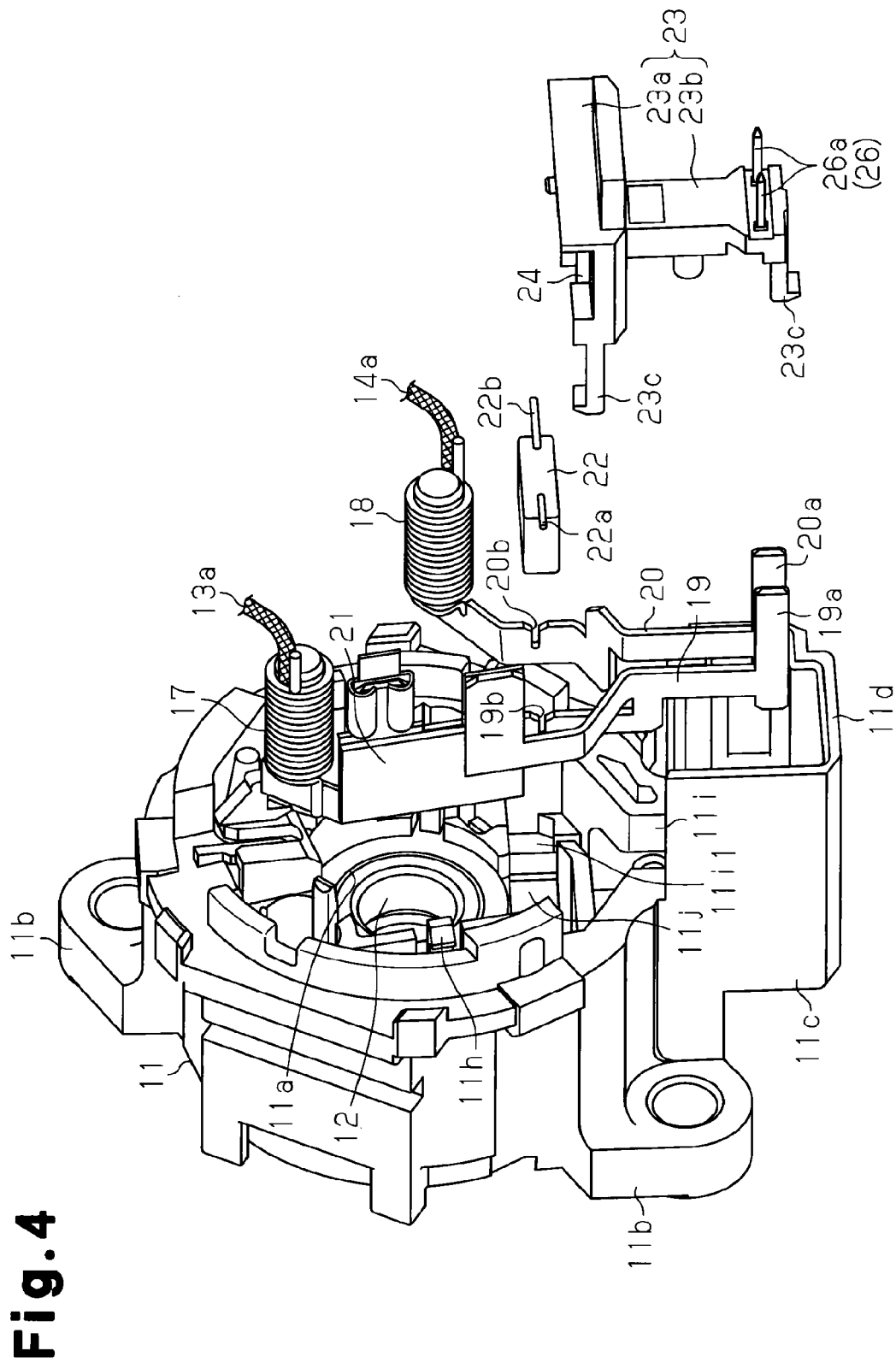
FIG. 4 is a perspective view showing the end bracket in a state in which various electrical components are removed therefrom.

As shown in FIGS. 2 and 3, the end bracket 11 has a peripheral portion including two fastening projections 11b, which are used to fix the end bracket 11 to the load device. The fastening projections 11b extend radially outward from the yoke 2 at positions spaced about from each other by 180° in the circumferential direction of the motor 1 as viewed in the direction of the axis L, or the axial direction. A connector support 11c formed integrally with the end bracket 11 extends outward in the radial direction of the yoke 2 near one of the fastening projections 11b. The connector support 11c includes a hollow portion 11d having a tetragonal cross-section. An external connector extending from a controller (neither shown) is receivable in the hollow portion 11d in the axial direction.

Two power supply brushes 13 and 14 and two torsion coil springs 15 and 16 are arranged on the inner surface (surface facing toward the yoke 2) of the end bracket 11. The power supply brushes 13 and 14 are movable in the radial direction inside the yoke 2 as viewed in the axial direction. The torsion coil springs 15 and 16 urge the corresponding power supply brushes 13 and 14 inward in the radial direction. This presses the power supply brushes 13 and 14 against the outer surface of the commutator 8 (refer to FIG. 1). The power supply brushes 13 and 14 and the connector support 11c are arranged at generally opposite sides of the hole 11a. Further, the power supply brushes 13 and 14 are spaced apart from each other by an interval of 90°. The torsion coil springs 15 and 16 are arranged within the 90° interval.

The power supply brushes 13 and 14 are arranged between the torsion coil springs 15 and 16 and choke coils 17 and 18, respectively. The choke coils 17 and 18 have distal ends connected to pig tails 13a and 14a extending from the power supply brushes 13 and 14, respectively. Further, the choke coils 17 and 18 have basal ends connected to first ends of power supply terminals 19 and 20, respectively. The power supply terminal 19 has a middle portion connected to a thermistor 21, which is formed by a plate having a tetragonal planar surface. The thermistor 21 is received in a thermistor accommodation recess 11e formed in the end bracket 11 so that its planar surface is parallel to and faces toward the axis L.

The power supply terminals 19 and 20 are spaced apart from each other and arranged at opposite sides of the hole 11a in the end bracket 11. Further, the power supply terminals 19 and 20 extend to the connector support 11c so as to become closer to each other as the connector support 11c becomes closer. The power supply terminals 19 and 20 are each formed from a conductive metal plate and has a planar surface. The power supply terminals 19 and 20 are arranged in accommodation grooves 11f and 11g, which are formed in the end bracket 11, so that the planar surfaces extend parallel to and face toward the axis L. The power supply terminals 19 and 20 are held in the end bracket 11 by a plurality of hooks 11h. L-shaped terminal plates 19a and 20a are respectively formed on distal ends of the power supply terminals 19 and 20 and extend parallel to the axis L in the hollow portion 11d of the connector support 11c.

A noise prevention capacitor 22 is connected between the two power supply terminals 19 and 20. Connection terminals 22a and 22b extend from one side of the noise prevention capacitor 22, which is box-shaped. The power supply terminals 19 and 20 each have a predetermined portion cut away from a side surface in a widthwise direction. This forms connection slits 19b and 20b in the power supply terminals 19 and 20, respectively. When the power supply terminals 19 and 20 are attached to the end bracket 11, the connection slits 19b and 20b extend in the axial direction. Further, a first accommodation recess 11i, which receives a rotation detector 23, is formed in the inner surface of the end bracket 11. A second accommodation recess 11j, which receives the noise prevention capacitor 22, is also formed in the inner surface of the end bracket 11. The second accommodation recess 11j further extends in the axial direction from part of the first accommodation recess 11i but is not open to the outer side of the end bracket 11. The first and second accommodation recesses 11i and 11j are arranged closer to the connector support 11c than the hole 11a of the end bracket 11 when viewed from the axial direction.

The noise prevention capacitor 22 is inserted into the second accommodation recess 11j in the axial direction. In this state, the surface of the noise prevention capacitor 22 that is orthogonal to the surface from which the connection terminals 22a and 22b extend is parallel to the axial direction. In this manner, the noise prevention capacitor 22 is received in the second accommodation recess 11j. The connection terminals 22a and 22b are pressed into and fixed to the corresponding connection slits 19b and 20b. This arranges the noise prevention capacitor 22 between the power supply terminals 19 and 20 and electrically connects the connection terminals 22a and 22b to the corresponding power supply terminals 19 and 20. Such a connection allows for automatic coupling of the noise prevention capacitor 22 in an automated line for mass-production of the motor 1.

The first accommodation recess 11i receives the rotation detector 23, which detects rotation or rotational speed of the motor 1 (armature 4) as rotation information. The rotation detector 23 includes a detector body 23a and a terminal holder 23b. A Hall IC 24 is coupled to a substrate 25, which is fixed to the detector body 23a. The terminal holder 23b holds two signal output terminals 26, which output a detection signal from the Hall IC 24. The substrate 25 is arranged on the detector body 23a so that its planar surface is parallel to the axis L when the rotational detector 23 is received in the first accommodation recess 11i. The Hall IC 24 is arranged on the substrate 25 so as to face toward the sensor magnet 9 in the radial direction when the end bracket 11 is attached to the open end 2b (refer to FIG. 1).

The first accommodation recess 11i includes a body accommodation portion 11i1, which receives the detector body 23a. The body accommodation portion 11i1 and the second accommodation recess 11j are arranged to be continuous in the axial direction. Accordingly, the noise prevention capacitor 22 is arranged in the motor 1 further outward from the detector body 23a in the axial direction. Further, the detector body 23a and the noise prevention capacitor 22 are aligned in the axial direction (refer to FIG. 1). Moreover, the body accommodation portion 11i1 and the second accommodation recess 11j are located inward from the yoke 2 in the radial direction. Thus, the detector body 23a and the noise prevention capacitor 22 are arranged inward from the yoke 2 in the radial direction.

The substrate 25 is connected to a basal end of each terminal 26. This electrically connects the Hall IC 24, which is coupled to the substrate 25, to the terminals 26. The terminals 26, which are inserted into or attached to and thereby held by the terminal holder 23b, extend to the connector support 11c. Each terminal 26 has an L-shaped distal end forming an output terminal plate 26a, which extends parallel to the axis L in the hollow portion 11d of the connector support 11c. The output terminal plates 26a are arranged at predetermined positions in the hollow portion 11d together with the power supply terminal plates 19a and 20a. Subsequent to the attachment of the noise prevention capacitor 22, the rotation detector 23 is attached to the first accommodation recess 11i by hooking two hooks 23c of the detector 23 to the end bracket 11.

The end bracket 11, which holds the electrical parts as described above, is attached and fixed to the open end 2b of the yoke 2, which accommodates the armature 4, to complete the motor 1. The external connector, which extends from the controller, is attached to the connector support 11c so that the external connector and the connector 11c are electrically connected with each other. This supplies the drive power to the brushes 13 and 14 via the power supply terminal 19 from the controller. The drive power is supplied to the coil 7 from the brushes 13 and 14 through the commutator 8 to rotate the armature 4. The IC 24 detects magnetic field variations of the sensor magnet 9 when the armature 4 (rotary shaft 5) rotates and sends a detection signal via the signal output terminals 26 to the controller. The controller uses the detection signal to detect rotation or rotational speed of the motor 1 (armature 4) as rotation information. Based on the rotation information, the controller controls the drive power and thus the rotation produced by the motor 1, which serves as a drive source for a power seat apparatus.

The present embodiment has the advantages described below.

(1) In the present embodiment, the noise prevention capacitor 22 is arranged between the two power supply terminals 19 and 20 on the end bracket 11. Further, the detector body 23a and the noise prevention capacitor 22 are aligned in the axial direction of the motor 1. This allows for enlargement of the motor 1 to be avoided in the radial direction. The arrangement of the noise prevention capacitor 22 between the power supply terminals 19 and 20 allows for the noise prevention capacitor 22 to have a compact layout. This also eliminates unnecessary crisscrossing of the connection terminals 22a and 22b over the power supply terminals 19 and 20. Thus, enlargement of the motor 1 may be avoided.

(2) In the present embodiment, the noise prevention capacitor 22 is arranged in the motor 1 further outward than the detector body 23a of the rotation detector 23 in the axial direction. This arranges the sensor magnet 9, which serves as a detected body arranged on the armature 4, in the motor 1 further inward from the noise prevention capacitor 22 in the axial direction. This allows for the armature 4 to be reduced in size in the axial direction.

(3) In the present embodiment, the end bracket 11 includes the first accommodation recess 11i (body accommodation portion nil), which accommodates the rotation detector 23, and the second accommodation recess 11j, which accommodates the noise prevention capacitor 22. The first and second accommodation recesses 11i and 11j are arranged continuously in the axial direction. This allows for easy arrangement of the rotation detector 23 (detector body 23a) and the noise prevention capacitor 22 to be near each other. Thus, the motor 1 may be reduced in size.

(4) In the present embodiment, the portion connecting the connection terminals 22a and 22b and the power supply terminals 19 and 20, namely, the connection slits 19b and 20b, is aligned with the detector body 23a in the axial direction. This allows for enlargement of the motor 1 to be avoided in the radial direction.

(5) In the present embodiment, the detector body 23a and the noise prevention capacitor 22 are arranged inward in the radial direction from the yoke 2. Further, the power supply terminals 19 and 20 and the signal output terminals 26 extend toward the connector support 11c from the inward side to the outward side in the radial direction of the yoke 2 so as to traverse the yoke 2. Thus, in the present embodiment, only the terminals 19, 20, and 26 are arranged in the connector support 11c and the portion of the end bracket 11 overlapped with the yoke 2 in the axial direction. Accordingly, in comparison to a motor that arranges a noise prevention capacitor and a detection body of a rotation detector in a connector support, the motor 1 of the present embodiment allows for the connector support 11c, which projects outward in the radial direction, to be reduced in size.

It should be apparent to those skilled in the art that the present invention may be embodied in many other specific forms without departing from the spirit or scope of the invention. Particularly, it should be understood that the present invention may be embodied in the following forms.

In the above-described embodiment, the noise prevention capacitor 22 is arranged in the motor 1 outward from the detector body 23a in the axial direction. Instead, the detector body 23a may be arranged in the motor 1 outward from the noise prevention capacitor 22 in the axial direction.

In the above-described embodiment, the first accommodation recess 11i (body accommodation portion 11i1) and the second accommodation recess 11j are continuously arranged in the axial direction in the end bracket 11. However, the present invention is not limited in such a manner, and the first accommodation recess 11i and the second accommodation recess 11j may be formed independently from each other.

In the above-described embodiment, the portion connecting the connection terminals 22a and 22b and the power supply terminals 19 and 20 is aligned with the detector body 23a in the axial direction. However, the connecting portion may be located at other positions.

In the above-described embodiment, the connector support 11c extends outward in the radial direction from the yoke 2. However, the location of the connector support 11c is not limited in such a manner. For example, the connector support 11c may extend outward in the radial direction, for example, from the yoke 2.

In the above-described embodiment, the present invention is applied to a brush-provided DC motor 1, which includes power supply brushes 13 and 14. However, the present invention may be applied to other motors such as a brushless motor.

In the above-described embodiment, the present invention is applied to a motor used as a drive source for a power seat apparatus of a vehicle. However, the present invention may be applied to a motor used for other apparatuses.

The present examples and embodiments are to be considered as illustrative and not restrictive, and the invention is not to be limited to the details given herein, but may be modified within the scope and equivalence of the appended claims.

What is claimed is:

1. A motor comprising:
   a rotor;
   a cylindrical housing including a closed end and an open end and accommodating the rotor in a rotatable manner;
   an end bracket fixed to the housing so as to close the open end and including a connector support;
   two power supply terminals extending to the connector support for electrical connection between the rotor and an external device;
   a noise prevention element including a connection terminal connected to the two power supply terminals; and
   a rotation detector that detects rotation information of the rotor and includes a detector body having a detection element;
   wherein the noise prevention element is arranged between the two power supply terminals, and the detector body and the noise prevention element are arranged at a portion of the end bracket closer to the connector support and aligned in an axial direction of the motor.

2. The motor according to claim 1, wherein the noise prevention element is located outward from the detector body in the axial direction.

3. The motor according to claim 1, wherein the end bracket includes a first accommodation recess, which accommodates the rotation detector, and a second accommodation recess, which accommodates the noise prevention element, and the first accommodation recess and the second accommodation recess are arranged continuously along the axial direction.

4. The motor according to claim 1, wherein a portion connecting the connection terminal and the power supply terminals is aligned with the detector body in the axial direction.

5. The motor according to claim 1, further comprising:
   a signal output terminal extending from the rotation detector;
   wherein the connector support is located outward from the housing in a radial direction; and
   the detector body and the noise prevention element are located inward from the housing in a radial direction, and the power supply terminals and the signal output terminal extend from a radially inward side of the housing to the connector support traversing the housing.

* * * * *